(12) United States Patent
Rangarajan et al.

(10) Patent No.: US 9,228,843 B2
(45) Date of Patent: Jan. 5, 2016

(54) SYSTEM AND METHOD FOR PROVIDING A DYNAMIC TELEMATICS DASHBOARD

(71) Applicant: Verizon Patent and Licensing Inc., Basking Ridge, NJ (US)

(72) Inventors: Jagannath K. Rangarajan, Irving, TX (US); Harold Rex Slay, Jr., Valrico, FL (US); Ajeet K. Gupta, Mahopac, NY (US); Robert A. Kneusel, Lithia, FL (US); Muhammed Shaphy, Irving, TX (US); Carl T. White, Odessa, FL (US); Kevin K. Darling, Ringwood, NJ (US); Vipul Kadia, Tampa, FL (US); Nityanand Sharma, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 26 days.

(21) Appl. No.: 14/137,018

(22) Filed: Dec. 20, 2013

(65) Prior Publication Data

US 2015/0177001 A1    Jun. 25, 2015

(51) Int. Cl.
*G06Q 10/00* (2012.01)
*G01C 21/26* (2006.01)
*G06Q 10/06* (2012.01)
*G06Q 30/00* (2012.01)
*H04W 24/08* (2009.01)

(52) U.S. Cl.
CPC ............. *G01C 21/26* (2013.01); *G06Q 10/00* (2013.01); *G06Q 10/06315* (2013.01); *G06Q 30/016* (2013.01); *H04W 24/08* (2013.01)

(58) Field of Classification Search
CPC ............ G06Q 10/00; G06Q 10/06315; G06Q 30/016; G01C 21/26; H04W 24/08
See application file for complete search history.

(56) References Cited

U.S. PATENT DOCUMENTS

| | | | | |
|---|---|---|---|---|
| 6,128,470 | A * | 10/2000 | Naidu et al. | 455/16 |
| 8,326,707 | B2 * | 12/2012 | Fan et al. | 705/28 |
| 2003/0055666 | A1 * | 3/2003 | Roddy et al. | 705/1 |

* cited by examiner

*Primary Examiner* — John Q Nguyen
*Assistant Examiner* — Michael Kerrigan

(57) ABSTRACT

An approach is described for providing telematics information in connection with equipment. The approach includes scanning equipment available in a service vehicle, wherein the service vehicle is located at a service location. The approach also includes determining location information for the service location based on telematics information associated with the service vehicle. The approach further includes mapping the equipment to the service location based on the location information.

20 Claims, 14 Drawing Sheets

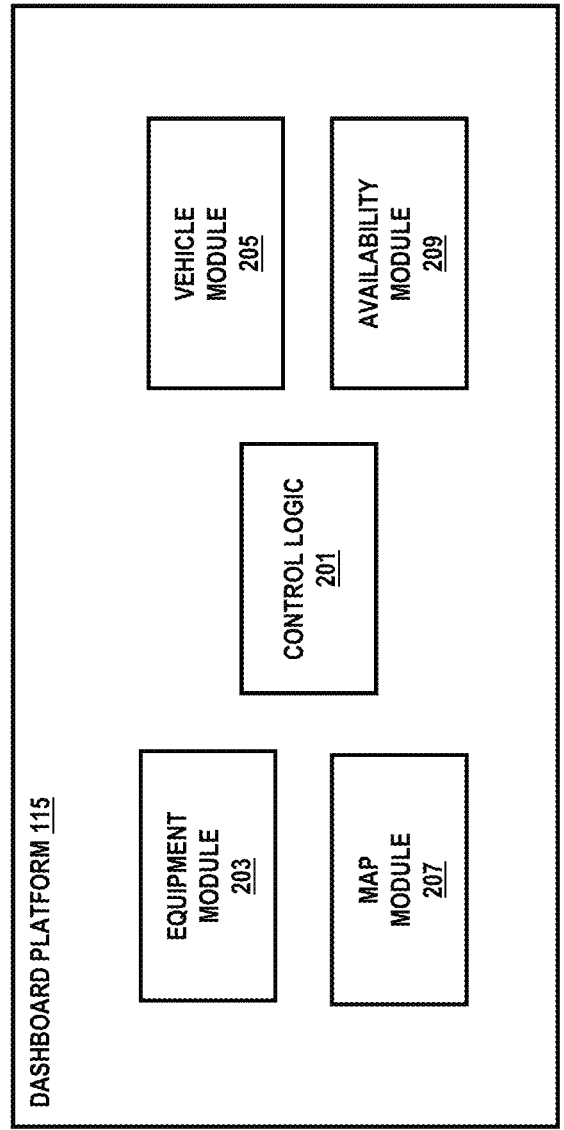

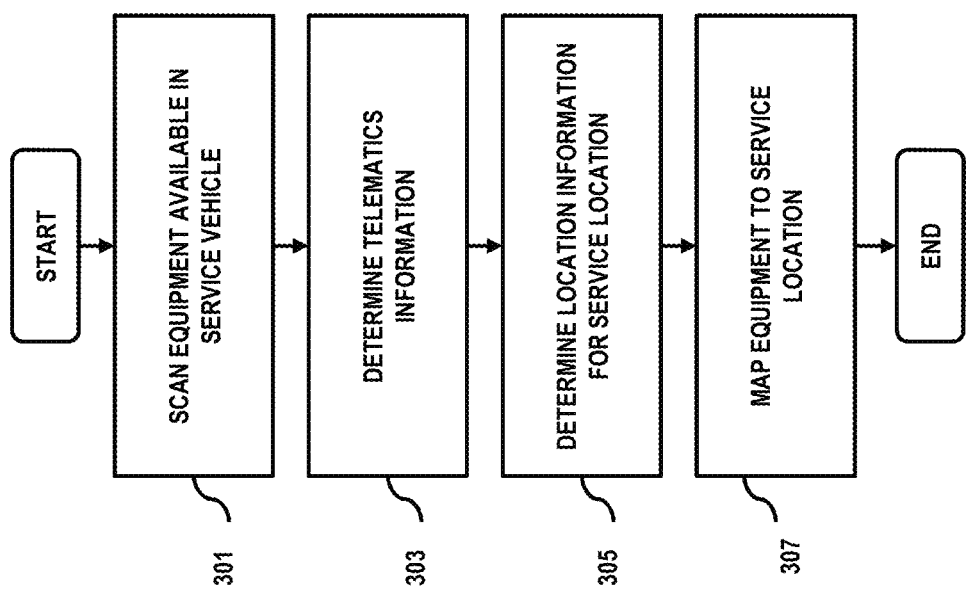

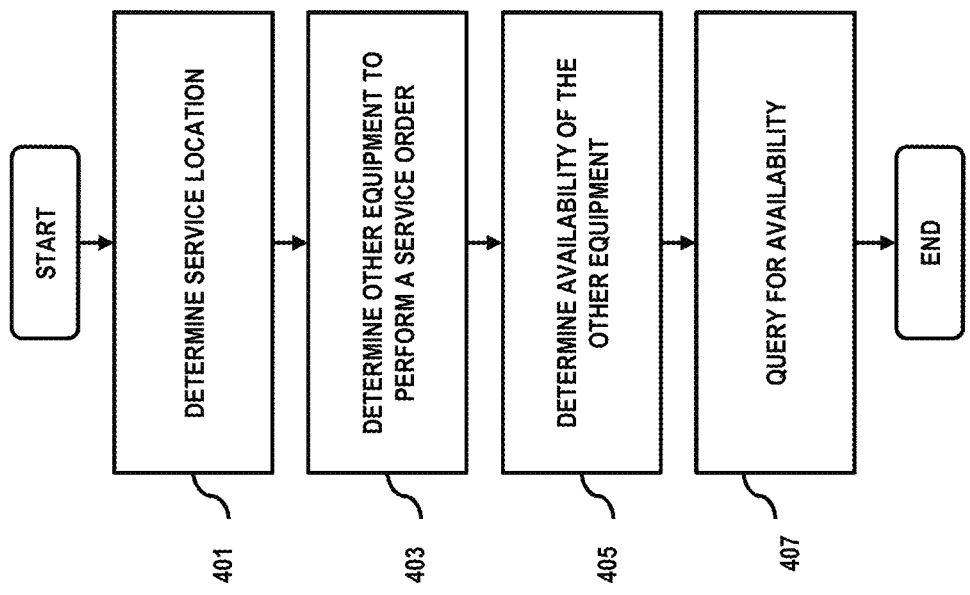
FIG. 4    400

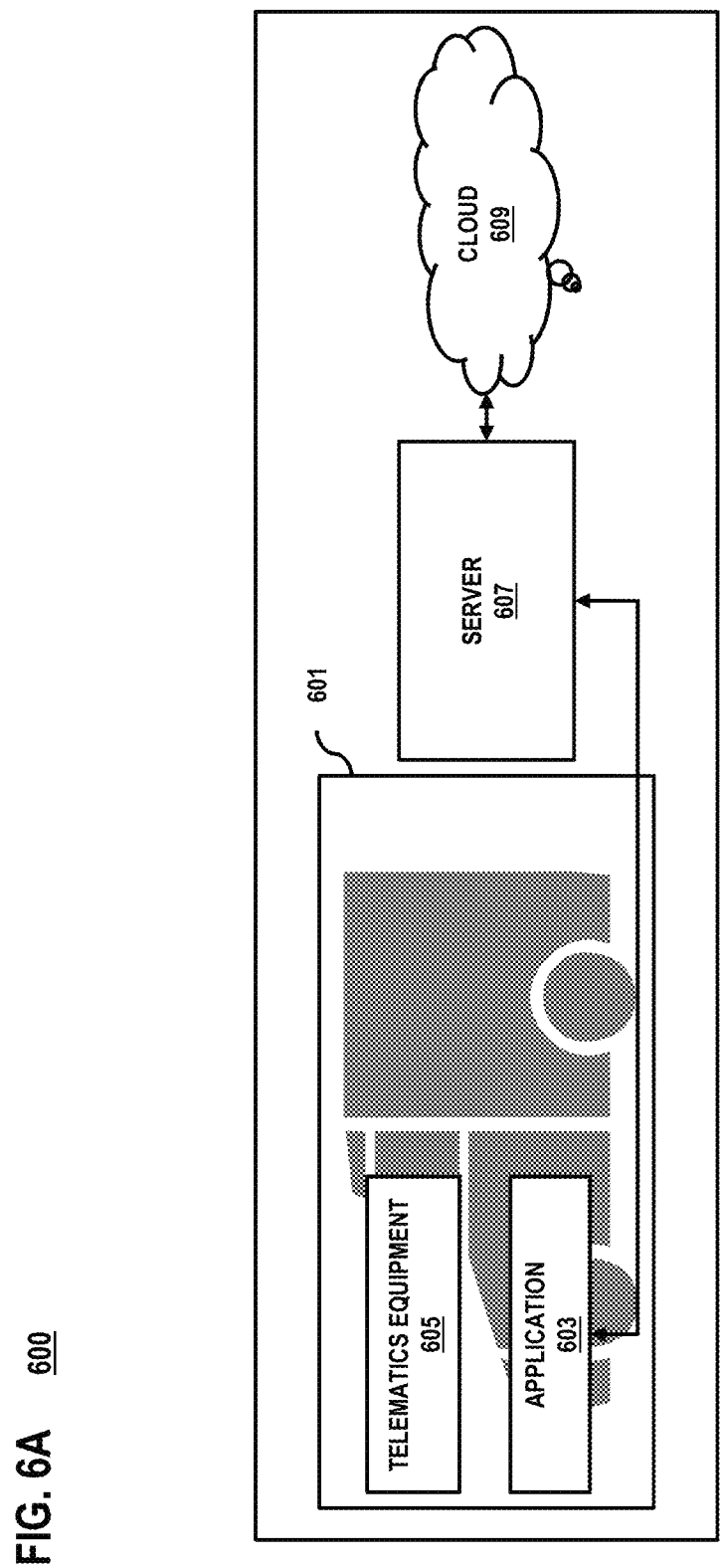

FIG. 6D
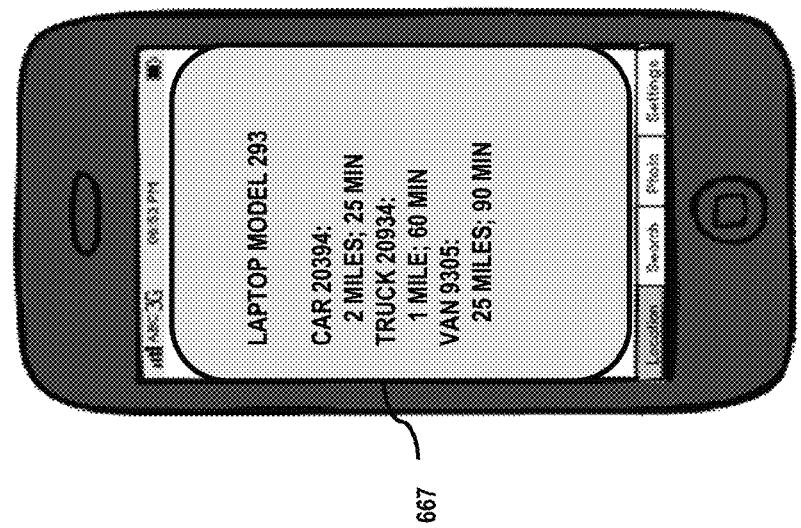
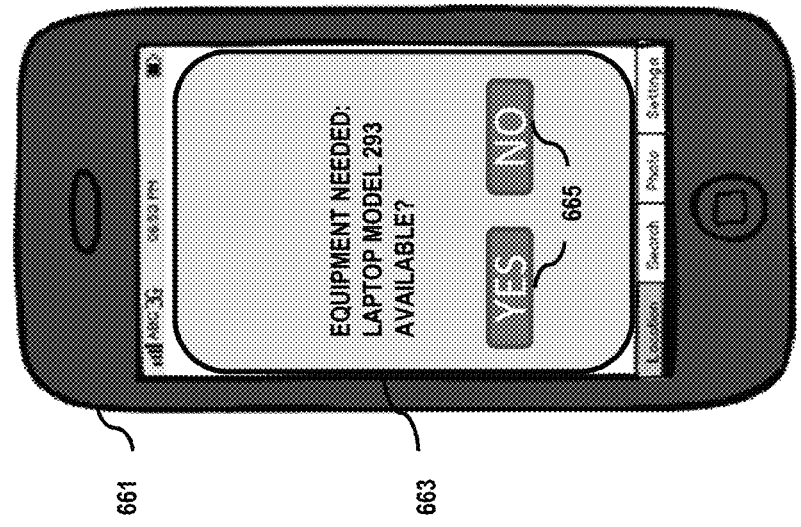

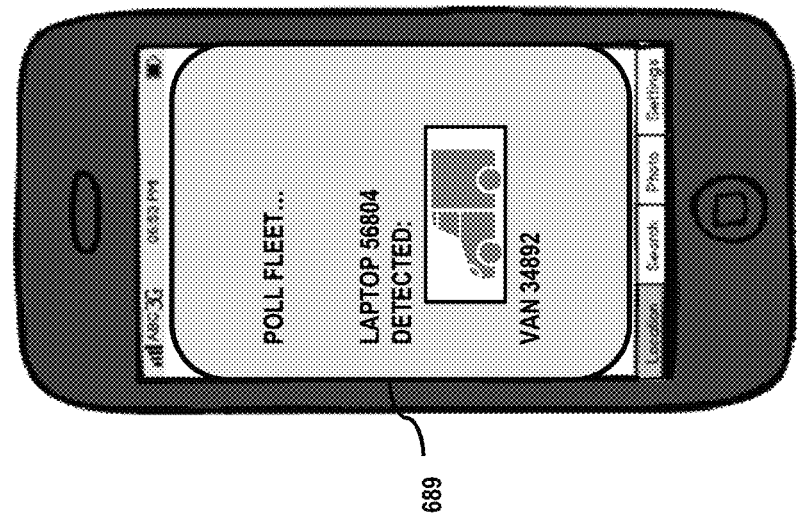
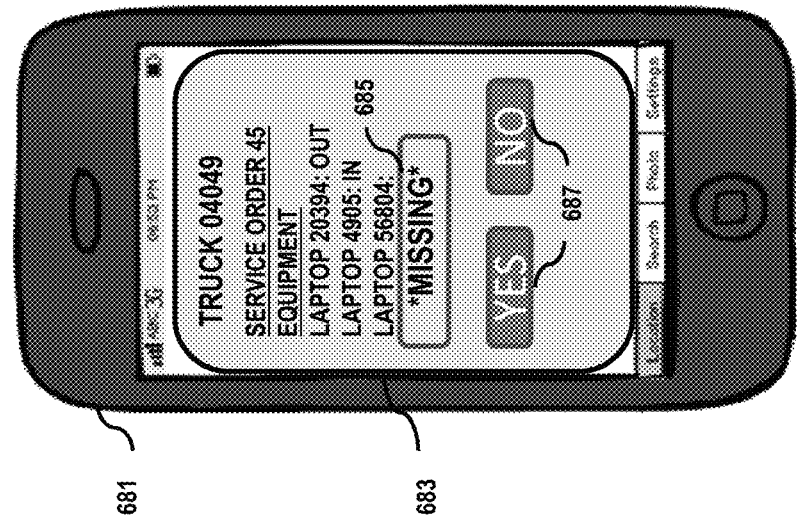
FIG. 6E

SYSTEM AND METHOD FOR PROVIDING A DYNAMIC TELEMATICS DASHBOARD

BACKGROUND INFORMATION

Service providers are continually challenged to deliver value and convenience to consumers by, for example, providing compelling network services. One area of development has been providing services based on telematics information. For example, telematics information is often used to provide aid for navigation and tracking of vehicle locations. Simultaneously, service vehicles for providing, for instance, repair work in response to service orders often work in coordinated fleets. A central operator typically deploys service vehicles and telematics may provide information on where various vehicles are located. Unfortunately, equipment and resources for the service orders are not accounted for by location. As such, service providers face challenges in routing service vehicles for service orders while taking into account available equipment relevant to repairs.

Based on the foregoing, there is a need for providing telematics information in connection with equipment.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 2A is a diagram of a dashboard platform capable of providing telematics information in connection with equipment, according to an exemplary embodiment;

FIG. 3 is a flowchart of providing telematics information in connection with equipment, according to an exemplary embodiment;

FIG. 4 is a flowchart of determining availability of equipment, according to an exemplary embodiment;

FIG. 6A is a system diagram utilized in the process of FIG. 3, according to an exemplary embodiment;

FIGS. 6B-6E are diagrams of user interfaces utilized in the process of FIG. 3, according to an exemplary embodiment;

DESCRIPTION OF THE PREFERRED EMBODIMENT

An apparatus, method, and software for providing telematics information in connection with equipment, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the preferred embodiments of the invention.

Although the various exemplary embodiments are described with respect to processing cloud computing and services, it is contemplated that these embodiments have applicability to other computing technologies and architectures.

Figure 1:
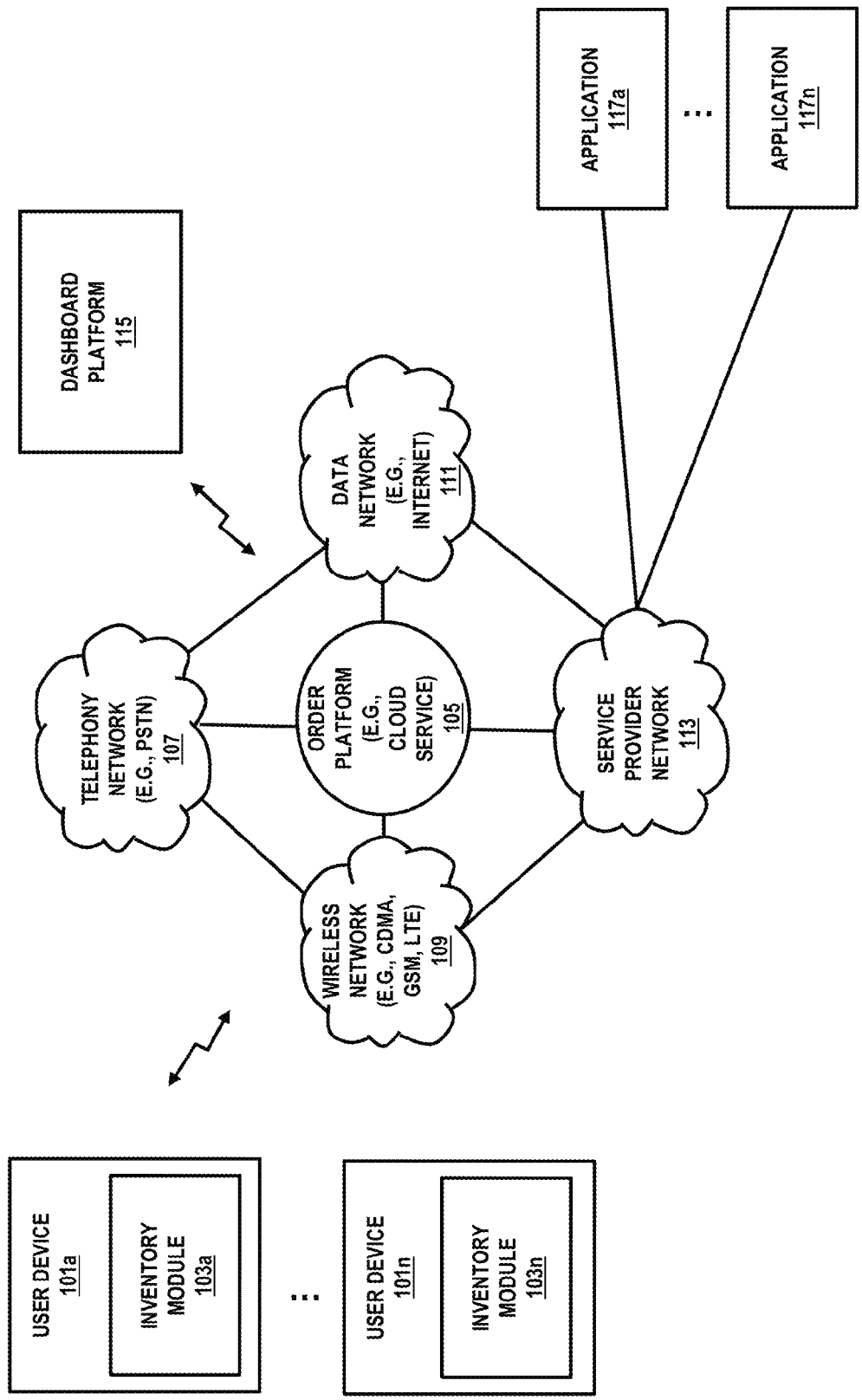
FIG. 1 is a diagram of a system capable of providing telematics information in connection with equipment, according to an exemplary embodiment.

FIG. 1 is a diagram of a system 100 providing telematics information in connection with equipment, according to one embodiment. For the purpose of illustration, system 100 for providing telematics information in connection with equipment involves determining equipment at, for example, user devices 101a-101n (or user devices 101). For example, user devices 101 may determine scanning in of equipment. In one embodiment, the user devices 101 may include inventory modules 103a-103n (or inventory modules 103). The inventory modules 103 may keep track of equipment and equipment specifications associated with respective user devices 101. According to certain embodiments, users at the user devices 101 may receive notifications regarding equipment from an order platform 105. In one embodiment, the order platform 105 may be comprised of a cloud service. In one embodiment, the user devices 101 and order platform 105 may communicate over one or more networks, such as telephony network 107, wireless network 109, data network 111, and/or service provider network 113. Additionally, the system 100 may employ dashboard platform 115 and applications 117a-117n (or applications 117) to determine location information to map to equipment registered with the inventory modules 103. The equipment and user devices 101 may be connected via applications 117, where application 117 may act as an intermediary between the user device 101 and dashboard platform 115 to permit locational tracking of equipment. While specific reference will be made hereto, it is contemplated that system 100 may embody many forms and include multiple and/or alternative components and facilities.

It is observed that telemetric information for vehicles is used to dynamically detect information regarding vehicles, for instance, location information associated with a given vehicle. Additionally, telemetric information for a collection of vehicles may be effective for fleet management, so that vehicles may be deployed and allocated, depending on their location. For instance, a central service may view a map of available taxis in a city and deploy an available taxi closest to a requesting passenger to serve that customer. Location information is regarding the vehicle only, and may not be linked to objects in association with the vehicle. Meanwhile, equipment and resources are often independently tracked by service order. As such, service providers face challenges in routing equipment to service orders based on location.

Therefore, the approach of system 100, according to certain exemplary embodiments, stems from the recognition that location of service vehicles may reflect locations of equipment associated with providing of the services. Service vehicles may include, for instance, vehicles including cars, vans, trucks, etc. Services provided relating to such vehicles may include, for example, technical repairs. For instance, service orders may request repairs for a faulty modem. A service van may then be deployed so that a technician may perform repairs on the modem. In one instance, equipment may include any hardware. For one such case, equipment may include replacement modems, tools to test and fix modems, etc.

In one embodiment, system 100 may discover equipment scanned into user devices 101 so that user devices 101 register the equipment with inventory modules 103. In one embodiment, user devices 101 may be associated with particular service vehicles, where location information of the service vehicles are available via the order platform 105. For instance, order platform 105 may be in communication with telematics equipment associated with service vehicles, where the order platform 105 sends telematics information to applications 117. The system 100 is then aware of equipment, service vehicles associated with the equipment, and location information of those service vehicles. Then, system 100 may map the location of the service vehicles to the equipment so that equipment may also have associated location information.

In one embodiment, the system 100 may further identify service orders and equipment needed for the service orders. In doing so, the system 100 may detect equipment needed at particular locations. For example, a service order may require a laptop and a battery, where a service vehicle attending to a service order may be transporting a laptop but be missing the battery. Then, the system 100 may identify batteries available in the vicinity of the first service vehicle and coordinate vehicles such that the battery may arrive at the location of the service order. In one embodiment, scanning of the equipment and/or availability of the equipment may include whether the equipment is in working condition. For example, if a technician is replacing a faulty modem with a working one, the system 100 may scan and identify the faulty modem as "in" and the working modem as "out." In other words, the faulty modem is "in" for returning to the repair service for fixing or discarding. The working modem is unavailable since it is in use by customers, and thus, "out." If the faulty modem is fixed and provisioned again, system 100 may update a status of the modem as "available" since it is working and may be used for a repair.

In one embodiment, the system 100 may provide a user interface view of equipment inventory and location of that inventory. In some variations, such a display would show up as equipment grouped by service vehicles. For example, the user interface view may appear as a map with various service vehicles at their respect locations on the map. Then, each service vehicle may include a symbol or blurb showing equipment associated with the vehicle so that a central service may see equipment locations. Furthermore, a user interface view showing service vehicles may include details on the vehicles. For instance, the view may display vehicle types where cars, vans, and/or trucks may each be displayed with representations reflective of the vehicle type. In showing this display, the system 100 may facilitate deploying specialty vehicles or vehicles particular to a certain type of service order task. For example due to parking constraints, a car may better respond to a service order in a crowded city over a van. Then, even if a van is closer to a service location, the system 100 may deploy a car for the particular service order.

System 100 may further employ telematics information to determine performance of a fleet, both in terms of vehicle usage and driver behavior. For example, telematics information may further provide insight on fuel economy, distance traveled, speed, driving time, etc. that may measure how vehicles within a fleet are used. For example, driving time may include the amount of time a vehicle is on the road versus parked (e.g., during a service order task). One such case may include idle time calculations, showing the duration for which a vehicle is idle since technicians sometimes keep vehicles idle when performing tasks. For another example, telematics information may inform the system 100 on driver behavior, including whether particular drivers speed often or tend to use more fuel than expected for the expected distance traveled, given the service orders associated with the service vehicle. For instance, system 100 may render driver scorecards, evaluating or analyzing driving habits of individual drivers (e.g., technicians associated with service vehicles).

Furthermore, the system 100 may determine from technicians, relative mobile network strengths as given from signal strengths readings taken from locations of the technicians (and thereby service vehicles). In doing so, the system 100 may build a graphical representation of mobile network strengths in a geographical area where service vehicles are active. Such a representation may further aid fleet management in accounting for where equipment location information may be unavailable and/or lacking due to network limitations. For example, a network may not be robust enough to register equipment and/or map location information associated with a service vehicle and location to the equipment. In one embodiment, communication between equipment and user devices 101 may take place through a local webserver to provide reliable usability without losing functionality.

In one embodiment, the inventory modules 103 may track equipment based on equipment associated with particular service vehicles. Furthermore, system 100 may identify vehicles by comparing telemetric information associated with equipment against telemetric information associated with vehicles. For example, equipment A may be associated with location information rendering global positioning coordinates (X, Y). The system 100 may further determine a vehicle at the coordinates (X, Y). Then, the system 100 may determine that the vehicle is the vehicle carrying and/or associated with transporting equipment A. In some instances, system 100 may further match this information with identification information regarding the vehicles. For example, the system 100 may identify the vehicle as vehicle #934, carrying equipment A. In some embodiments, this may be useful where a piece of equipment switches associations with vehicles and/or where system 100 does not readily identify a vehicle.

In one embodiment, the inventory modules 103 may provide an account of equipment associated with a user device 101. For example, user device 101 may include a portable tablet that may interface with telemetric information associated with a vehicle, as well as the equipment. In one embodiment, the inventory modules 103 may further provide specifications associated with equipment and information regarding equipment conditions. For instance, a technician may scan an equipment into recognition by the inventory modules 103 via an application 117 functioning from a user device 101. Such scanning may cause the inventory modules 103 to identify the equipment, both in terms of specifications and any form of identification. For example, a piece of equipment such as a modem may include a make and model for specifications, as well as a particular serial number that identifies that specific modem. Then, inventory modules 103 may further determine whether the equipment is functioning.

For instance, when technicians take possession over a piece of equipment that was once in use by a customer, inventory modules 103 may note the equipment as "in." The faulty equipment is now "in" inventory and no longer out in use. If a piece of equipment is installed and being used by a customer, inventory modules 103 may denote the equipment as "out," since the equipment is no longer in the hands of the service entity. Simultaneous, inventory modules 103 may also mark the status of a piece of equipment as "faulty", "repair", and/or "ready for use." For example, some equipment may be damaged or faulty, but not be slated for repair immediately. This equipment may have the status, "faulty." Equipment that is to be repaired may be labeled "repair" by inventory modules 103; "ready for use" may show that a piece of equipment is functioning and ready to be used for any service order.

In one embodiment, the order platform 105 may determine service locations. For instance, the order platform 105 may receive service orders as well as telemetric information. For example, order platform 105 may receive, through the telephony network 107 and/or wireless network 109, orders for repair work. In some cases, service orders may be placed by a service provider, or directly from customers of the service. Simultaneously, the order platform 105 may receive telemetric information associated with vehicles. For instance, the service provider network 113 may keep track of vehicles associated with the service. Those vehicles may be linked via the service provider network 113, where their respective telemetric information is available within the service provider network 113 and accessible to the order platform 105. Then, the order platform 105 may interact with the dashboard platform 115 to determine vehicles from which to retrieve telemetric information to map to equipment determined by the inventory module 103.

In one embodiment, the dashboard platform 115 may primarily form the association between equipment and location information. For example, the dashboard platform 115 may receive, from inventory modules 103, identified equipment. The dashboard platform 115 may also access telemetric information via the order platform 105. The dashboard platform 115 may identify a service vehicle associated with a service order and/or equipment, and create the tie between location information of a service vehicle, and the equipment. The dashboard platform 115 may further collect information regarding vehicle and/or driver performance. For instance, the dashboard platform 115 may collect telemetric information relating to vehicle usage. Vehicle usage may also inform the dashboard platform 115 on driver performance in using the vehicles. Furthermore, collective telemetric information may permit the dashboard platform 115 insight into network strengths across a geographic area where a service is operating. For instance, the dashboard platform 115 may determine antenna strengths by testing various antennas' ability to receive signals. In one such case, the dashboard platform 115 may selectively turn antennas associated with the vehicles and/or user devices 101 on or off to determine antenna strengths and respond to network strengths.

In one embodiment, the dashboard platform 115 may present the equipment, vehicle, and associated vehicle information as part of a user interface dashboard view. For instance, the dashboard platform 115 may create a dashboard view of vehicles on a map, where details on equipment associated with the vehicles may selectively appear. For example, a user may hover a pointer over a vehicle to cause the equipment details to appear. The dashboard view may be available, both to a central operator, as well as at the user devices 101.

In one embodiment, applications 117 may serve as the means by which the user devices 101 interact with the order platform 105 and dashboard platform 115. For example, application 117 may install an entry for a piece of equipment in the inventory module 103a of a user device 101. Then, application 117 may determine that the equipment is required at a service order residing in order platform 105 and determine telemetric information available from order platform 105. In one embodiment, application 117 then prompt dashboard platform 115 to map equipment found in inventory modules 103 to telemetric information from order platform 105.

By way of example, user device 101 can be any type of mobile terminal, fixed terminal, or portable terminal including a mobile tablet, handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the user device 101 can support any type of interface to the user (such as "wearable" circuitry, etc.). In one embodiment, the application 117 may be any type of application that is executable at the user device 101.

The service provider network 113 can interact with one or more networks, such as a telephony network 107, a wireless network 109, and/or a data network 111. The service provider network 113 can include applications 117 that provide services to the service provider network 113. Additional services associated with, for example, the telephony network 107, the wireless network 109, or the data network 111, may also interact with the user devices 101, order platform 105, dashboard platform 115, and applications 117. By way of example, a service associated with the data network 111 can store information relating to equipment specifications. When inventory modules 103 register equipment, information on the equipment may be supplemented by details in the data network 111 regarding the make and model of the equipment, as well as the equipment's status relative to inventory within the entire system 100. For instance, the data network 111 may determine that a piece of equipment is one out of ten of that model within the system. The inventory modules 103 may then access this information to supplement its knowledge of a piece of registered equipment.

For illustrative purposes, the networks 107-113 may be any suitable wireline and/or wireless network, and be managed by one or more service providers. For example, telephony network 107 may include a circuit-switched network, such as the public switched telephone network (PSTN), an integrated services digital network (ISDN), a private branch exchange (PBX), or other like network. Wireless network 109 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 107-113 may be completely or partially contained within one another, or may embody one or more of the aforementioned infrastructures. For instance, the service provider network 113 may embody circuit-switched and/or packet-switched networks that include facilities to provide for transport of circuit-switched and/or packet-based communications. It is further contemplated that networks 107-113 may include components and facilities to provide for signaling and/or bearer communications between the various components or facilities of system 100. In this manner, networks 107-113 may embody or include portions of a signaling system 7 (SS7) network, or other suitable infrastructure to support control and signaling functions.

According to exemplary embodiments, end user devices may be utilized to communicate over system 100 and may include any customer premise equipment (CPE) capable of sending and/or receiving information over one or more of networks 107-113. For instance, voice terminal may be any suitable plain old telephone service (POTS) device, facsimile machine, etc., whereas mobile device (or terminal) may be any cellular phone, radiophone, satellite phone, smart phone, wireless phone, or any other suitable mobile device, such as a personal digital assistant (PDA), pocket personal computer, tablet, customized hardware, etc.

FIG. 2A is a diagram of a dashboard platform capable of providing telematics information in connection with equipment, according to one embodiment. Dashboard platform 115 may comprise computing hardware (such as described with respect to FIG. 8), as well as include one or more components configured to execute the processes described herein for providing the processing services of system 100. In one implementation, the dashboard platform 115 contains a control logic 201, an equipment module 203, a vehicle module 205, a map module 207, and an availability module 209. The control logic 201 performs control logic functions and facilitates coordination among the other components of dashboard platform 115.

In one embodiment, the control logic 201 and equipment module 203 may identify equipment. For example, the control logic 201 and equipment module 203 may work with the networks 107-113 and order platform 105 to identify pieces of equipment scanned in and thereby registered with the dashboard platform. For example, a technician using a UE 101 may scan a piece of equipment so that the inventory module 103 and dashboard platform 115 is made aware of the equipment and its function and/or location.

In one embodiment, the control logic 201 and vehicle module 205 may also determine service vehicles, both in terms of identifying service vehicles as part of a fleet of vehicles, specifications associated with vehicles, information regarding vehicle usage, and telematics information associated with the vehicles. Identifying service vehicles may include recognizing one or more vehicles as service vehicles, deployed as part of a service. For example, the vehicles may be for repair work, transporting people, delivering objects, etc. Specifications associated with vehicles may include vehicle type, gas mileage, associated network strength, capacity, current inventory, etc. For instance, vehicle type may include compact car, van, truck, etc. Associated network strength may include readings of mobile network strengths from each vehicle and/or user device 101 associated with a service vehicle. Capacity may refer to equipment inventory associated with a vehicle, for example, how many pieces of equipment a service vehicle is carrying and what those pieces of equipment are. Information regarding vehicle usage may include the service orders to which a vehicle is assigned to perform, a technician assigned to a vehicle (at least for a portion of time), parameters regarding how a vehicle is driven, etc. Telematics information may include location information associated with a vehicle.

In one embodiment, the control logic 201 and map module 207 may map equipment to service locations based on location information derived from vehicle telematics information. For example, the control logic 201 and map module 207 may determine that a piece of equipment noted by the control logic 201 and equipment module 203 is associated with a particular service vehicle identified within the vehicle module 205 with control logic 201. Then, control logic 201 and map module 207 may associate the piece of equipment with the service vehicle such that location information associated with the service vehicle is also associated with the piece of equipment. In some instances, the location information is a service location where a task in response to a service order is to be carried out.

In one embodiment, the control logic 201 and map module 207 may further identify service orders. In doing so, the control logic 201 and map module 207 may identify equipment needed, as dictated by service orders. For instance, the control logic 201 and map module 207 may determine that equipment "A" is at service location "A" for service order "A." Service order A may further require equipment "B." Then, the control logic 201 and map module 207 may determine whether equipment B is also at service location A based on location information associated with equipment B. If equipment B is not at service location A, the control logic 201 and map module 207 may determine vehicles associated with equipment B and present a user interface where a user may better prompt vehicles associated with equipment B to arrive at service location A to complete service order A.

In one embodiment, the control logic 201 and availability module 209 may determine availability of equipment or query for availability of equipment. For example, the control logic 201 and availability module 209 may interact with inventory modules 103 to determine whether equipment is available to perform a service order. For instance, the inventory modules 103 may be aware of a piece of equipment, but the equipment may be in use and/or not functioning. If this is the situation, the control logic 201 and availability module 209 may determine that a piece of equipment is not available to fill a particular service order. In one embodiment, the control logic 201 and availability module 209 may query more inventory modules 103 until it finds an available piece of equipment. For example, the control logic 201 and availability module 209 may determine that an additional piece of equipment is needed at a service location where the service vehicle at the location does not already have that equipment. Then, the control logic 201 and availability module 209 may start by querying UEs 101 (and respective inventory modules 103) within a five-mile radius from the service location for the equipment. If the equipment does not appear to be available within the five-mile radius, the control logic 201 and availability module 209 may extend the area of querying for the equipment until a piece of available equipment is found.

Figure 2B:
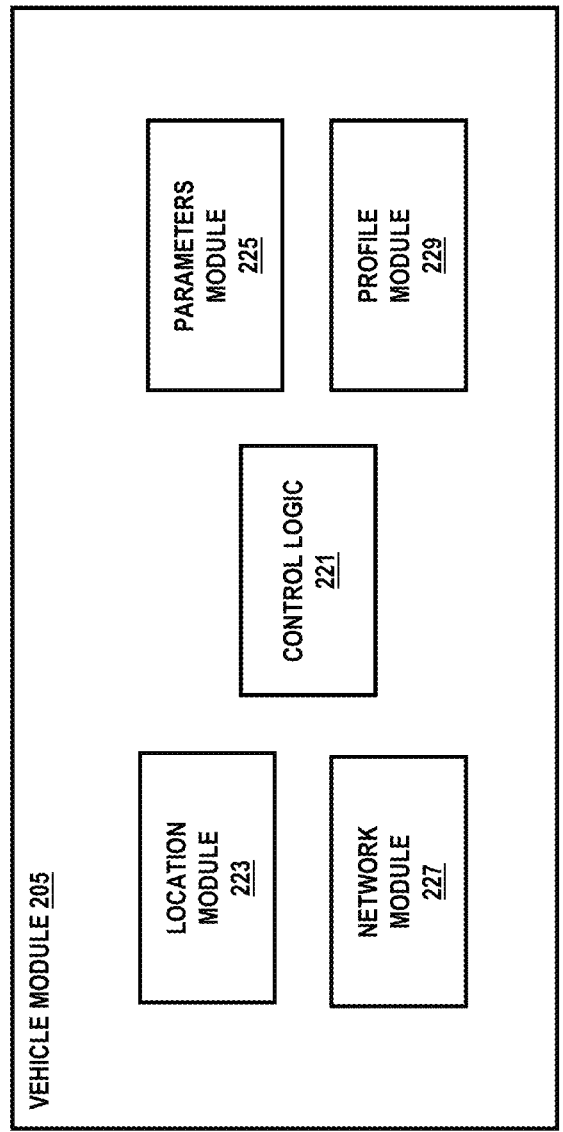
FIG. 2B is a diagram of a vehicle module capable of determining characteristics associated with service vehicles, according to one embodiment.

FIG. 2B is a diagram of a vehicle module capable of determining characteristics associated with service vehicles, according to one embodiment. Vehicle module 205 may comprise computing hardware (such as described with respect to FIG. 8), as well as include one or more components configured to execute the processes described herein for providing the processing services of system 100. In one implementation, the vehicle module 205 contains a control logic 301, location module 223, parameters module 225, network module 227, and profile module 229. The control logic 221 performs control logic functions and facilitates coordination among the other components of vehicle module 205.

In one embodiment, the control logic 221 and location module 223 may determine location information. For example, the control logic 221 and location module 223 may determine both service location associated with a service order and/or the location of a service vehicle based on telematics information associated with the service vehicle. In other words, the control logic 221 and location module 223 may be in contact with the order platform 105 to determine locations of service orders to which service vehicles are to be deployed. Then, the control logic 221 and location module 223 may also be in contact with telematics information associated with service vehicles, perhaps associated with UEs 101 to determine actual locations of the vehicles.

In one embodiment, the control logic 221 and parameters module 225 may determine parameters associated with the service vehicle to gauge driver and/or vehicle performance. For instance, the control logic 221 and parameters module 225 may determine parameters regarding vehicles including fuel economy, distance traveled, average load and speed, driving time, time per gear, speed, and/or idle time calculations. For example, time per gear may refer to time spent in each gear and idle time calculations may refer to how long vehicles are idle without turning off the engine. In some cases, technicians may leave vehicles idle while completing brief tasks. However, tasks may take longer than expected, which would meant that vehicles are left running idle for relatively long lengths of time. Then, supervisors may use such information to improve miles per gallon (MPG) or fuel efficiency and usage. In other words, the control logic 221 and parameters module 225 may not only determine parameters for vehicle performance analysis, the control logic 221 and parameters module 225 may also analyze vehicle performance (based on the parameters) for various service vehicles.

In one embodiment, the control logic 221 and parameters module 225 may further tie performance to particular drivers. For instance, the control logic 221 and parameters module 225 may set "Driver" as one of the parameters associated with vehicle performance. In one such case, the control logic 221 and parameters module 225 may associate a particular driver (or technician) with a given service vehicle. Then, the control logic 221 and parameters module 225 may collectively analyze vehicle performance in association with a particular driver to monitor and gather information on driving habits. Such analysis may further reduce fuel consumption and improve savings and efficiency within a fleet of service vehicles.

In one embodiment, the control logic 221 and network module 227 may determine relative mobile network strengths. For example, the control logic 221 and network module 227 may prompt the user devices 101 to take readings of mobile network strengths. Then, control logic 221 and network module 227 may construct a graph of signal strengths for a geographic area where a fleet is operating. In a further embodiment, the control logic 221 and network module 227 may prompt various user devices 101 and/or vehicles to temporarily turn different antennas on and off. In doing so, the control logic 221 and network module 227 may determine antenna strength on a device for each antenna and/or bolster antenna strength by prompting some antennas to turn on if they are not already on. User devices 101 and/or vehicles may each have one or more antennas. To summarize, the control logic 221 and network module 227 may gauge network strength and strengthen a signal captured at user devices 101 and vehicles, given the network strength.

In one embodiment, the control logic 221 and profile module 229 may create profiles for vehicles and/or drivers of the vehicles. For instance, the control logic 221 and profile module 229 may track the parameters set out by the control logic 221 and parameters module 225 to determine scores for vehicle use, service orders completed in association with particular vehicles, and/or equipment associated with each vehicle. The control logic 221 and profile module 229 may also create driver behavior scorecards for their driving to be evaluated. In one embodiment, the control logic 221 and profile module 229 may dynamically update as vehicle information is received and as technicians interact with inventory available to each vehicle.

FIG. 3 is a flowchart 300 of providing telematics information in connection with equipment, according to one embodiment. In step 301, the control logic 201 may scan equipment available in a service vehicle, wherein the service vehicle is located at a service location. For example, a service location may include a location where a service order and relevant repair task is to be completed. A service vehicle (and technician) may be assigned to complete that service order, where control logic 201 may acquire data on the equipment associated with the service vehicle and location information for both the vehicle and associated equipment. For steps 303 and 305, the control logic 201 may determine location information for the service location based on telematics information associated with the service vehicle. In one embodiment, the control logic 201 may map the equipment to the service location based on the location information. For instance, equipment associated with a vehicle is likely to have the same location information as the vehicle. Then, control logic 201 maps the location information from vehicle telematics information to equipment. In one embodiment, the control logic 201 may further present a user interface view including the service vehicle, wherein the user interface view is available via a local webserver.

FIG. 4 is a flowchart 400 of determining availability of equipment, according to one embodiment. In step 401, the control logic 201 may determine a service location, for example, a location where a service order is placed. For step 403, the control logic 201 may determine that other equipment is required to perform a service order at the service location based on the location information. For instance, the control logic 201 may determine, with the order platform 105, equipment generally required to complete a certain type of service order. Control logic 201 may then ascertain whether all of the required equipment is en route to the service location or with location information corresponding to that of the service location. For step 407, the control logic 201 may determine that the other equipment is not available in the service vehicle, and for step 409, query for an availability of other equipment in one or more other service vehicles. For instance, the control logic 201 may determine equipment with location information proximate a service location where a particular piece of equipment is unavailable. Then, the control logic 201 may prompt routing of available equipment to the service location.

Figure 5:
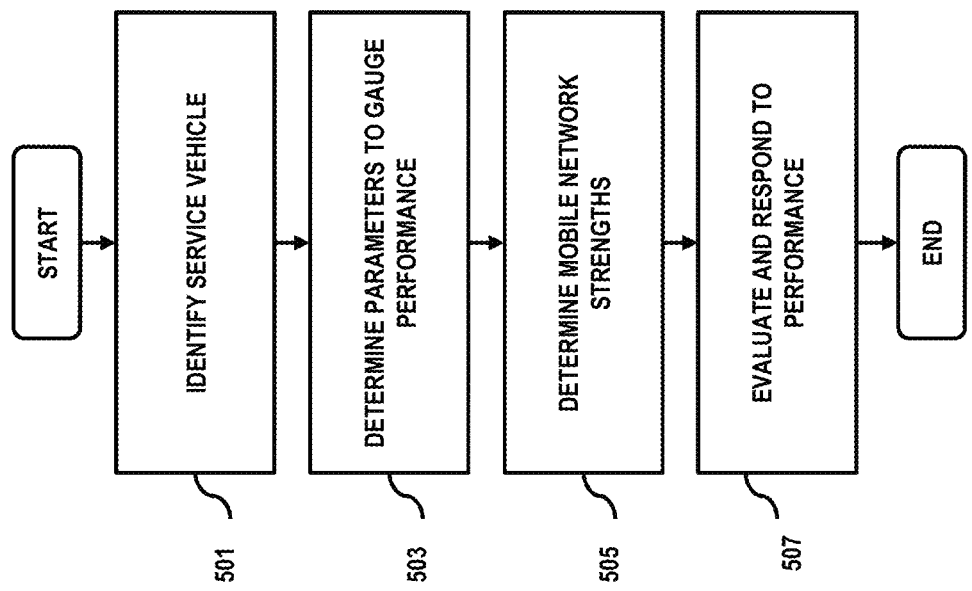
FIG. 5 is a flowchart of managing a dashboard for a service vehicle, according to an exemplary embodiment.

FIG. 5 is a flowchart 500 of managing a dashboard for a service vehicle, according to one embodiment. For example, the control logic 221 may identify the service vehicle based on the location information and the telematics information in step 501. In step 503, the control logic 221 may determine parameters associated with the service vehicle to gauge driver and/or vehicle performance, wherein the parameters may include fuel economy, distance traveled, average load and speed, driving time, time per gear, speed, and/or idle time calculations. In a further example, the control logic 221 may determine relative mobile network strengths based on the service vehicle (step 505). For example, the control logic 221 may select one or more antennas to turn on or off based on the mobile network strengths. For another example, the control logic 221 may deploy other service vehicles or return driver evaluations based on parameters analyzed in step 503.

FIG. 6A is a system diagram 600 utilized in the process of FIG. 3, according to an exemplary embodiment. For example, vehicle 601 may contain a tablet user device with a mobile application 603. The tablet user device may be a gateway for through which system 600 recognizes equipment. In one embodiment, tablets may be associated with at least one vehicle 601, so that equipment recognized through a tablet is also linked to the vehicle associated with the tablet. In addition, vehicle 601 may contain telematics equipment 605 tracking location information and identification information of the vehicle 601. In one embodiment, the application 603 may automatically scan equipment in the vehicle 601 to send updates on equipment to a server 607 for the tablets. For instance, the server 607 may keep track of all the tablets associated with a fleet comprised of at least one vehicle 601. By extension, the server 607 manages all the equipment recognized by the tablets via application 603.

In one embodiment, the server 607 may also manage all equipment inventory existing in a system 600, including equipment scanned from application 603. In one embodiment, the server 607 may provide the equipment information to a cloud 609. In another embodiment, the application 603 may send location updates to the cloud 609, where the cloud 609 then contains location information both of the vehicle 601 and equipment noted by the application 603 on a tablet user device. In one embodiment, the server 607 and/or the cloud 609 may link equipment information (from the server 607) to the location information of vehicle 601. In one embodiment, the server 607 may further include information on service orders, where the service orders dictate service locations. Then, the server 607 may locate equipment via location information from cloud 609 and route a vehicle 601 to a service job where the vehicle 601 carries available equipment that has location information proximate the service location.

Figure 6B:
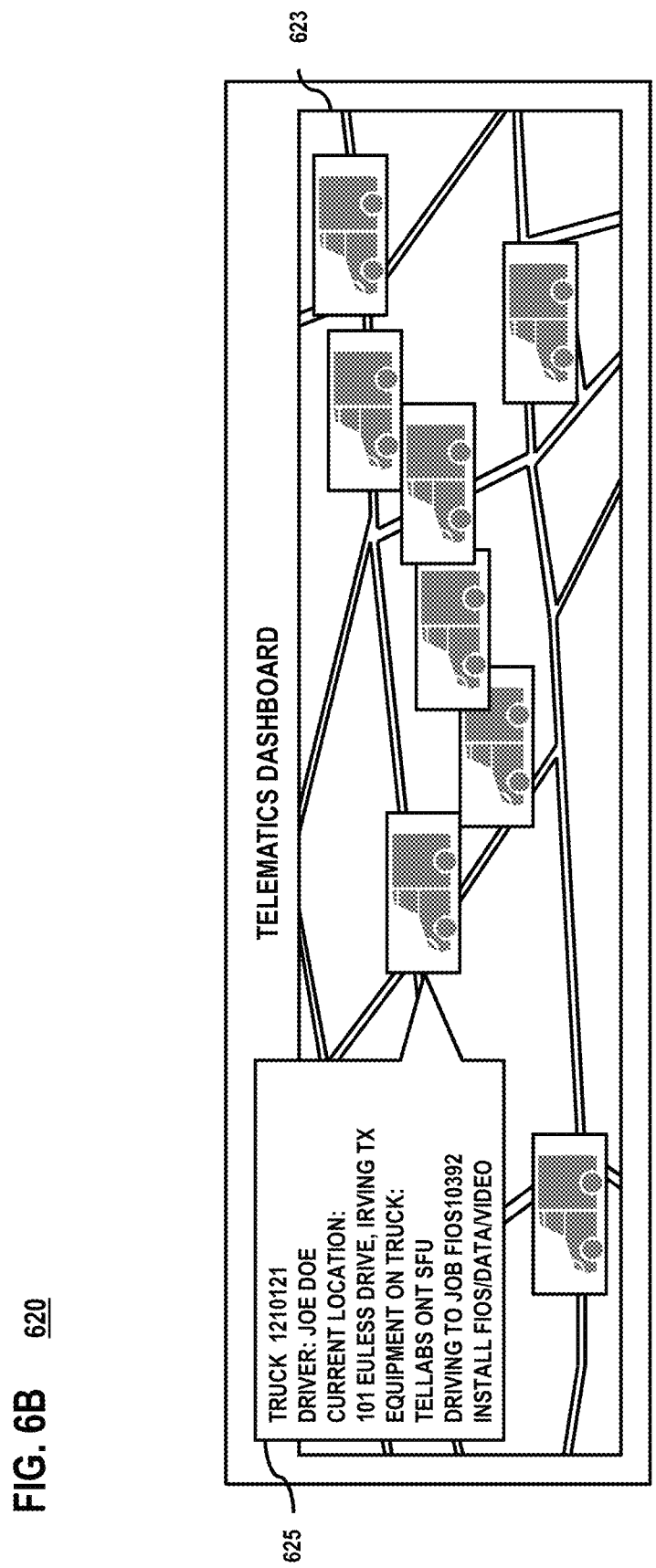

FIGS. 6B-6E are diagrams of user interfaces utilized in the process of FIG. 3, according to exemplary embodiments. FIG. 6B is a diagram of user interface 620, which may comprise a telematics dashboard with various vehicles 601 shown on a map 623. In one embodiment, user interface 620 may provide an overview of all the vehicles 601 within a fleet. In a further embodiment, the user interface 620 may optionally include descriptions 625 for each vehicle 601, including for example, identification information, a driver and/or technician associated with the vehicle 601, route information, location information, equipment associated with the vehicle, and service order information. For example, identification information may include a serial number that identifies a particular vehicle 601 within a fleet. Route information may include future and present directions that a vehicle 601 may travel. Service order information may include the location of the service order, a serial number identifying the service order, and the task to be completed by the service order.

Figure 6C:
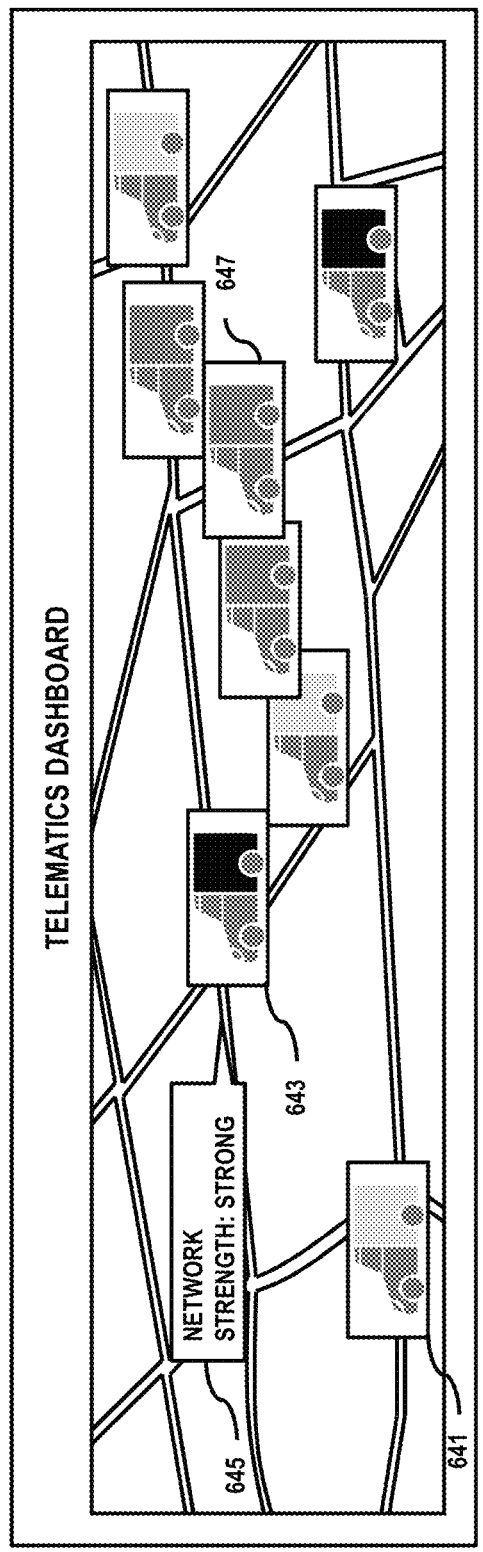

FIG. 6C is a diagram of user interface 640, showing inferences or information given by telematics data associated with vehicles, according to one embodiment. For example, user interface 640 may include a graphical representation of relative network strengths. For instance, a lightest color vehicle icon 641 may show a weak network strength, whereas dark color icon 643 may represent strong network strength. In one embodiment, network strength may correlate with coloring of icons. User interface 640 may further include at least one dialog box 645 describing the meaning of the coloring. For instance, dialog box 645 reads, "Network Strength: Strong," in following with the dark color of the icon 643.

In another embodiment, various coloring may indicate various other vehicle characteristics. For instance, dark color icon 643 may indicate a vehicle en route to a service location, working on a service order and light color icons 641 may indicate vehicles returning to a central station after completing a service order. A medium color icon 647 indicate, for instance, a parked vehicle or a vehicle in between assigned tasks. In yet another embodiment, various coloring may indicate availability of equipment. For instance, the user interface 640 may be specific to a particular piece of equipment, where light icon 641 shows where the equipment is unavailable, dark icons 643 show where the equipment is available and the vehicle is available to move to the service location requiring the equipment, whereas medium color icon 647 means that the equipment is available in the vehicle and location, but the vehicle cannot yet be mobilized. A medium color icon 647 may include, for instance, when the vehicle is parked at a service location and task is not yet complete at the location, so the vehicle cannot yet move on to deliver the equipment.

FIG. 6D is a diagram of user interface 660 where a vehicle may request equipment from other vehicles within the same fleet, according to one embodiment. For instance, a tablet 661 may include a notification 663 querying for available equipment. For instance, notification 663 may include the make and model of a particular piece of equipment. In one embodiment, the notification 663 may further include buttons 665 for a technician to respond as to whether he has the equipment in his vehicle and/or if he has equipment available. In one embodiment, querying for equipment may be done automatically in the backend of system 600. In another embodiment, technicians may aid the process for confirming availability, especially if there may be a lag between when equipment is "in" or "out" in the system versus when the equipment is actually available.

Notification 667 may be an example of a listing of available equipment, as given by responses collected from notification 663. For example, notification 667 may include vehicles that carry the equipment, along with the distance of those vehicles from the requesting site. In one embodiment, the requesting site may be the service location. In another embodiment, the requesting site may be location information associated with a vehicle assigned to the service location. For instance, if the vehicle assigned to the service location is first at another service location, a vehicle carrying the necessary equipment may deliver the equipment to the vehicle at the first service location. Then, the vehicle assigned to the service location may have the equipment in time for his next service order. In another embodiment, the service order may be routed to a vehicle that is both available to service and carrying the equipment. In one embodiment, notification 667 may further include estimated times where a vehicle may reach the requesting vehicle. This timing may take into account both travel time, as well as the timing before the vehicle is available. For instance, if a technician associated with a vehicle responding to delivering equipment to a requesting vehicle is still working on a service order, the timing may reflect the timing expected before he completes the order and can arrive to deliver the equipment.

FIG. 6E is a diagram of user interface 680 of an alert that may prompt a query for equipment, according to one embodiment. For instance, tablet 681 may receive a service order (here, shown as "Service Order 45"), with a listing of equipment needed for the service order. In one embodiment, the notification 683 may show the equipment needed for the service order and whether the equipment is accounted for, by tablet 681 in association with a vehicle. For instance, notification 683 shows a service order, "Service Order 45," and vehicle, "Truck 04049." For instance, where tablet 681 is associated with a service vehicle, notification 683 may indicate whether service order equipment is in the vehicle (and therefore at the location of the vehicle). Notification 683 may include a listing of equipment for the service order. Where equipment required for a service order is recognized by tablet 681 as sharing location information with a vehicle, notification 683 may show the status of the equipment. Where the equipment is not detected, notification 683 may include a warning 685. In one embodiment, warning 685 may include flashing and/or color changes to bring attention to the warning 685. In a further embodiment, notification 683 may include buttons 687 for users to confirm that the equipment required for the service order is not within the vehicle. For instance, a technician may select a "NO" button of the buttons 687 where he simply has not yet scanned a piece of equipment for recognition by tablet 681. The equipment is, however, available within the vehicle. In another embodiment where the equipment is not within the vehicle, a user may select the "YES" button of buttons 687 to prompt notification 689. Notification 689 may show polling a fleet of vehicles for the missing equipment. In one embodiment, the notification 689 may include successful results showing where a piece of equipment is located or the vehicle associated with the equipment. For instance, notification 689 may include a serial number for the vehicle carrying the "missing" piece of equipment.

Figure 6F:
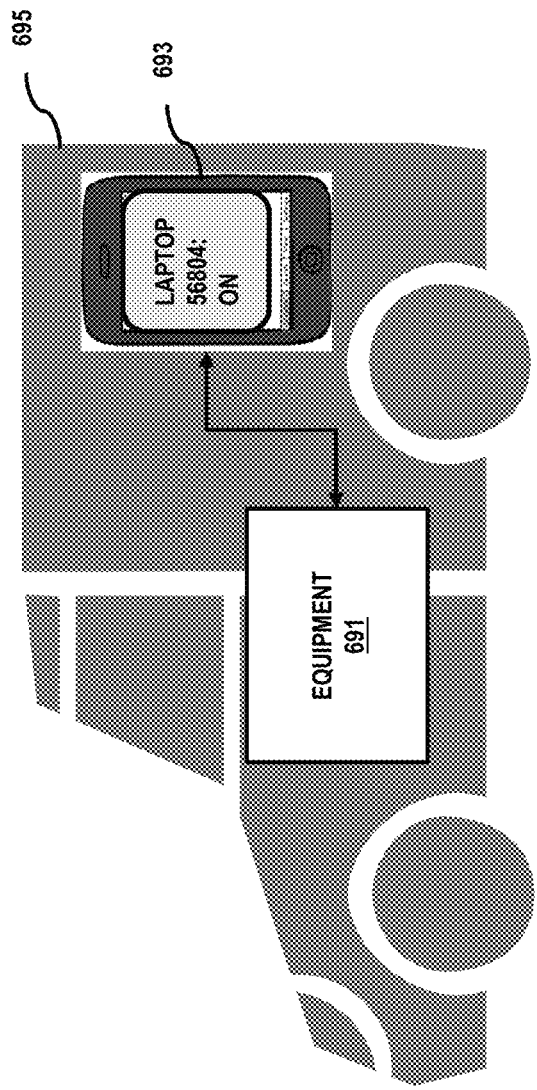
FIG. 6F is a diagram for scanning equipment prior to provisioning with the system, according to an exemplary embodiment.

FIG. 6F is a diagram 690 for scanning equipment prior to provisioning with the system, according to an exemplary embodiment. For instance, the system 100 may initialize equipment 691 by scanning the equipment 691 with user device 693. Then, user device 693 may have location information associated with the telematics information of a vehicle 695. In one embodiment, the location information may constitute a customer premises, where scanning the equipment 691 identifies the equipment 691 as part of the inventory of vehicle 695. In one embodiment, the user device 693 may have records of service orders to be completed with vehicle 695, along with equipment required for those service orders. A user (i.e., a technician) may scan equipment into the user device 693 so that the user device 693 may project to a dashboard, the equipment in inventory for vehicle 695. In addition, user device 693 may determine whether all the equipment necessary for vehicle 695's service orders are accounted for.

In one embodiment, user device 693 may scan equipment 691 for identification information. After scanning, a record of the identification information (or any other information) related to equipment 691 may appear on user device 693. In one embodiment, provisioning of equipment 691 for use as part of a service order repair may be contingent on user device 693 recognizing that identification information of equipment 691 corresponds to equipment needed for a service order for vehicle 695. For example, user equipment 693 may also not verify deployment of vehicle 695 from a central station until all the equipment needed for service orders are scanned in and identified as vehicle 695's inventory.

In addition, user device 693 may scan in working equipment and scan out bad equipment to complete a repair order. For instance, status of "in" may show that equipment is in use as part of a service, whereas "out" denotes equipment being out of commission. Then, user device 693 may scan replacement equipment "in" when it is put into use and consequently scan a broken piece of equipment "out" to bring it back to a facility where the equipment may be repaired or retired. In one embodiment, the user device 693 may denote a service order as complete only where a piece of equipment is scanned in and another piece of equipment is scanned out. The system 100 may note this type of exchange as replacing a broken part and successful completion of a service order. In another instance, user device 693 scanning may identify equipment 691 as being broken and not yet repaired, based on records associated with equipment identification information. Then, user device 693 may prevent equipment 691 from being scanned into service to fulfill a service order. In other words, scanning by the user device 693 may block provisioning of the equipment 691 into service until the equipment 691 is repaired or tested as good and functional.

The processes described herein for providing for providing a metadata management framework may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
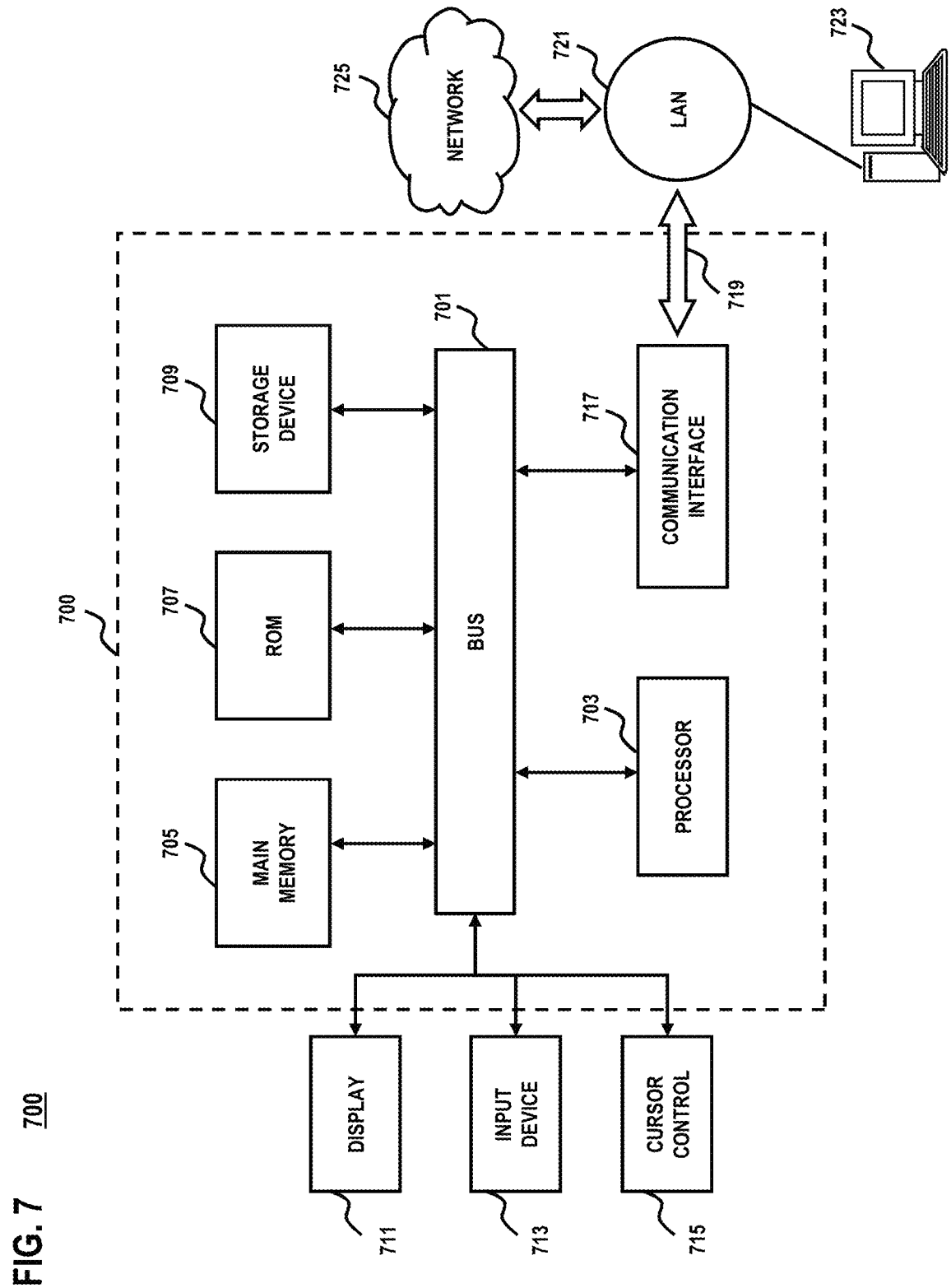
FIG. 7 is a diagram of a computer system that can be used to implement various exemplary embodiments.

FIG. 7 is a diagram of a computer system that can be used to implement various embodiments. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multiprocessing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
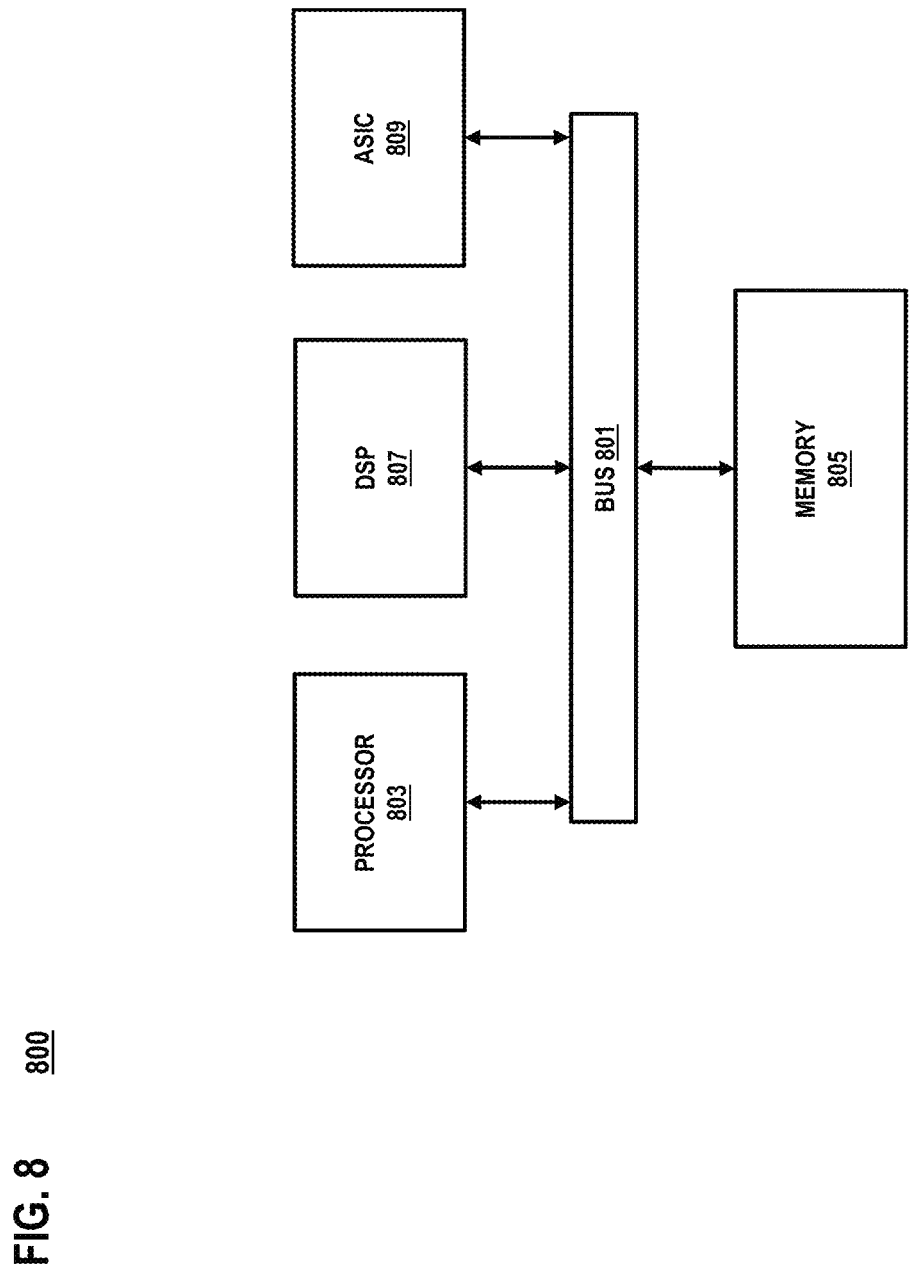
FIG. 8 is a diagram of a chip set that can be used to implement various exemplary embodiments.

FIG. 8 illustrates a chip set 800 upon which an embodiment of the invention may be implemented. Chip set 800 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of FIGS. 3-5.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    scanning equipment available in a service vehicle, wherein the service vehicle is part of a fleet of service vehicles of a service provider and is located at a service location;
    determining location information for the service location based on telematics information associated with the service vehicle;
    mapping the equipment to the service location based on the location information; and
    presenting a user interface view including the service vehicle,
    wherein the user interface view comprises a telematics dashboard with the fleet of service vehicles shown on a map,
    wherein the user interface view includes descriptions for each vehicle including identification information, a driver and/or technician associated with the vehicle, route information, location information, equipment associated with the vehicle, and service order information, and
    wherein each vehicle in the user interface view is represented by a color icon and different colors of the color icon indicate a specific status of the equipment with respect to said each vehicle.

2. A method of claim 1, further comprising:
    determining that other equipment is required to perform a service order at the service location based on the location information.

3. A method of claim 2, further comprising:
    determining that the other equipment is not available in the service vehicle; and
    querying for an availability of the other equipment in one or more other service vehicles.

4. A method of claim 1, further comprising:
    identifying the service vehicle based on the location information and the telematics information.

5. A method of claim 1, further comprising:
    determining parameters associated with the service vehicle to gauge driver and/or vehicle performance,
    wherein the parameters may include fuel economy, distance traveled, average load and speed, driving time, time per gear, speed, and/or idle time calculations.

6. A method of claim 1, further comprising:
    determining relative mobile network strengths based on the service vehicle; and
    selecting one or more antennas to turn on or off based on the mobile network strengths.

7. A method of claim 1,
    wherein the user interface view is available via a local webserver.

8. An apparatus comprising a processor configured to:
    scan equipment available in a service vehicle, wherein the service vehicle is located at a service location;
    determine location information for the service location based on telematics information associated with the service vehicle;
    map the equipment to the service location based on the location information; and
    present a user interface view including the service vehicle,
    wherein the user interface view comprises a telematics dashboard with the fleet of service vehicles shown on a map,
    wherein the user interface view includes descriptions for each vehicle including identification information, a driver and/or technician associated with the vehicle, route information, location information, equipment associated with the vehicle, and service order information, and
    wherein each vehicle in the user interface view is represented by a color icon and different colors of the color icon indicate a specific status of the equipment with respect to said each vehicle.

9. An apparatus according to claim 8, wherein the apparatus is further configured to:
    determine that other equipment is required to perform a service order at the service location based on the location information.

10. An apparatus according to claim 9, wherein the apparatus is further configured to:
    determine that the other equipment is not available in the service vehicle; and
    query for an availability of the other equipment in one or more other service vehicles.

11. An apparatus according to claim 8, wherein the apparatus is further configured to:
    identify the service vehicle based on the location information and the telematics information.

12. An apparatus according to claim 8, wherein the apparatus is further configured to:
    determine parameters associated with the service vehicle to gauge driver and/or vehicle performance,
    wherein the parameters may include fuel economy, distance traveled, average load and speed, driving time, time per gear, speed, and/or idle time calculations.

13. An apparatus according to claim 8, wherein the apparatus is further configured to:
    determine relative mobile network strengths based on the service vehicle; and
    select one or more antennas to turn on or off based on the mobile network strengths.

14. An apparatus according to claim 8,
    wherein the user interface view is available via a local webserver.

15. A system comprising:
    a platform configured to scan equipment available in a service vehicle, wherein the service vehicle is located at a service location,
    wherein the platform is further configured to determine location information for the service location based on telematics information associated with the service vehicle,
    map the equipment to the service location based on the location information, and
    present a user interface view including the service vehicle, wherein the user interface view comprises a telematics dashboard with the fleet of service vehicles shown on a map, wherein the user interface view includes descriptions for each vehicle including identification information, a driver and/or technician associated with the vehicle, route information, location information, equipment associated with the vehicle, and service order information, and wherein each vehicle in the user interface view is represented by a color icon and different colors of the color icon indicate a specific status of the equipment with respect to said each vehicle.

16. A system according to claim 15, wherein the platform is further configured to:

determine that other equipment is required to perform a service order at the service location based on the location information.

17. A system according to claim 16, wherein the platform is further configured to:

determine that the other equipment is not available in the service vehicle; and query for an availability of the other equipment in one or more other service vehicles.

18. A system according to claim 15, wherein the platform is further configured to:

identify the service vehicle based on the location information and the telematics information.

19. A system according to claim 15, wherein the platform is further configured to:

determine parameters associated with the service vehicle to gauge driver and/or vehicle performance, wherein the parameters may include fuel economy, distance traveled, average load and speed, driving time, time per gear, speed, and/or idle time calculations.

20. A system according to claim 15, wherein the platform is further configured to:

determine relative mobile network strengths based on the service vehicle; and select one or more antennas to turn on or off based on the mobile network strengths.

* * * * *